United States Patent Office 3,019,701
Patented Feb. 6, 1962

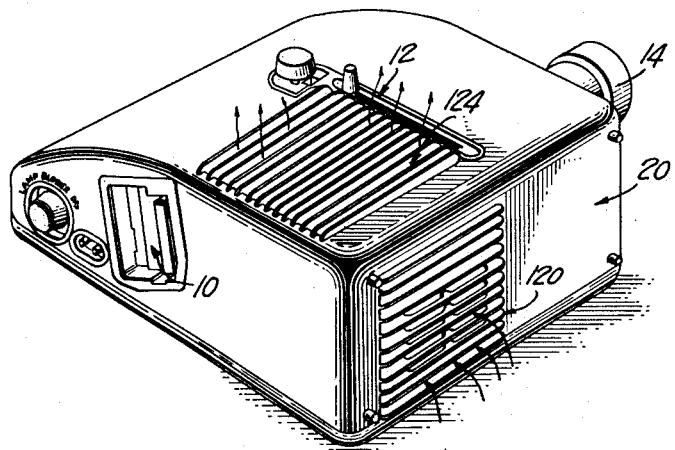
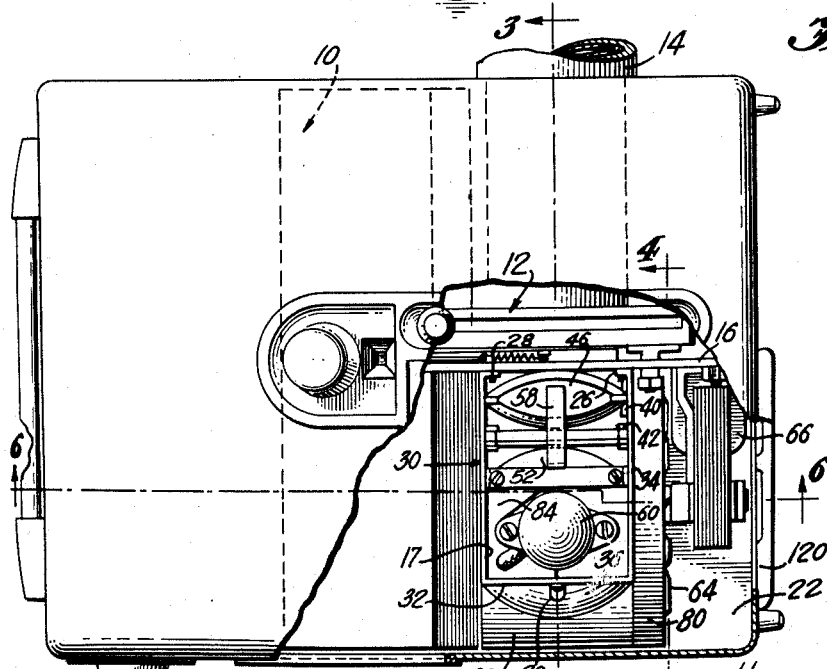

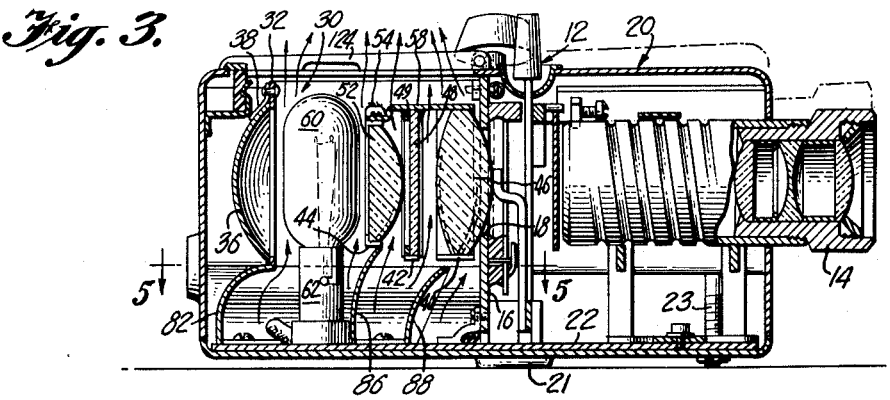
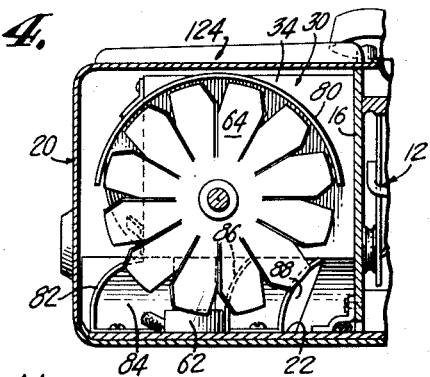
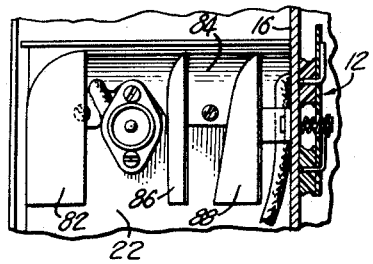
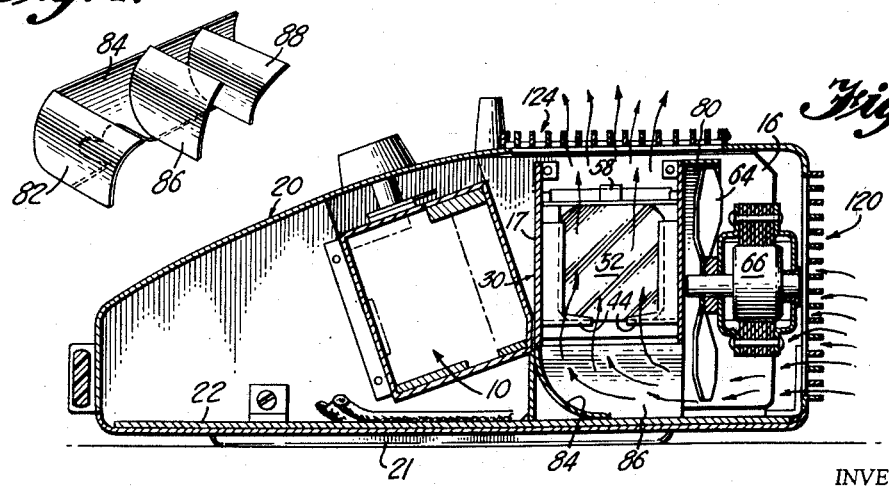

3,019,701
SLIDE PROJECTOR
Hubert U. Brueckner, Lombard, Edward E. Fluskey, Oak Park, and Wolodymyr Werbyckyj, River Grove, Ill., assignors to Revere Camera Company, a corporation of Delaware
Filed May 27, 1960, Ser. No. 32,479
2 Claims. (Cl. 88—24)

This invention relates to a single magazine type slide projector which has been reduced in overall size and bulk to facilitate storage and transport of the same and more particularly to the cooling system employed in said slide projector.

One object of the invention is to provide a highly efficient cooling system, required because of the reduction in size of the projector.

Another object is to provide an improved means whereby air is caused to circulate through said projector more efficiently so as to avoid temperatures which are harmful to the apparatus and which may result in discomfort or injury to the operator when his hands or other portions of his body come into physical contact with any portion of the projector or its housing.

Still another object of the invention is to provide a cooling system wherein impairment of the slide, objectionable heating of the apparatus and potential discomfort to the operator of the projector occasioned by overheating of the same are minimized notwithstanding the restrictions induced by reducing the size of the apparatus and of the cooling system therein.

Still a further object of the invention is to provide an apparatus in which air is caused to circulate in a definite path to remove heat from the apparatus promptly and directly.

Another object of the invention is to provide a projector wherein the forced circulation of air prevents any external surface of the apparatus from becoming heated to a temperature sufficient to cause harm or discomfort to the operator of the projector or to cause harm to the table or other means on which the slide projector is supported.

Still another object of the invention is to provide a compact apparatus in which the above objects are accomplished by a small, compact and highly efficient cooling system.

Still another object of the invention is to provide a cooling system which is quiet in operation in addition to being highly efficient.

These and other objects will become more apparent from the following description of a projector constructed in accordance with the invention. In the drawings:

FIGURE 1 is a perspective view of the entire projector;
FIGURE 2 is a plan view of the projector with a portion of the cover broken away;
FIGURE 3 is a section taken along plane 3—3 of FIGURE 2;
FIGURE 4 is a fragmentary view of the device, taken along plane 4—4 of FIGURE 2;
FIGURE 5 is a plan view of the portion seen in FIGURE 2 with certain elements removed to show further details of the apparatus;
FIGURE 6 is another side view of the projector taken along plane 6—6 of FIGURE 2 to reveal internal details; and
FIGURE 7 is a perspective showing the deflector unit.

The mechanism of the projector shown is mounted in and largely enclosed by an irregularly box-shaped housing or casing 20 preferably made of plastic or other moldable material. The lowermost surface of housing 20 is offset from a table or other support by legs (not shown) and by an adjustable screw 23 by means of which the tilt of the projector may be altered. Boss 21 shown beneath the casing conceals a novel slide transporting mechanism, described in a separately filed application Serial No. 32,480, filed by us of even date with the present application, and entitled "Slide Transfer Mechanism." Enclosed within the casing are a slide magazine housing 10, a slide transfer mechanism 12, an objective lens and lens mounting 14, and in one corner of the enclosure, are the means for cooling the apparatus, constituting the invention with which the present application is specifically concerned.

Since the specific objective lens tube, slide magazine tunnel and slide transfer mechanism are not necessary to a complete understanding of the present invention, they will not be described in detail in this application. These and other portions of the projector are supported on a generally flat base 22. A vertical mounting plate 16 is secured to base 22 by welding or any other suitable mode of fastening. A window 18 is cut out of plate 16 in alignment with the lens system and the forward wall of plate 16 serves as the support for portions of the slide transfer mechanism.

The rear wall of plate 16 serves as an attachment and support for flanges 26 and 28 on a U-shaped member 30. Member 30 is secured to the rear of plate 16, e.g. by screws or welding. As best seen in FIGURE 2, housing 30 which defines a lamp and lens compartment consists of three vertical wall sections 17, 32 and 34. Sidewalls 17 and 34 are solid. Rear wall 32 is provided with a window adapted to receive a silvered reflector 36 removably held in place by spring clips 38 or other similar means so that the reflector covers the window in wall 32.

The inner faces of walls 17 and 34 serve as supports for three guides 40, 42 and 44. Guide 40 comprises spaced J shaped tracks adapted to receive the forward condensing lens 46 which is inserted in the tracks and drops into position in alignment with the cut away window 18 in support plate 16.

Guide 42 consists of a U shaped frame formed of channel shaped metal. The upwardly extending legs of the U are secured to the inner faces of walls 17 and 34 and define a recess into which a heat filter 48 and gasket 49 are slidingly received. The third and rearmost guideway 44 is of a configuration adapted to receive a lens 52 slidingly inserted into it.

Slightly offset upwardly from the uppermost portion of guide 44 are two angles 54 attached to sidewalls 17 and 34 respectively. A T shaped spring clip 58 serves as a holddown to prevent accidental displacement and consequent breakage of the lenses. Each end of the transverse portion of the T is secured to one angle 54, e.g. by a screw and the body of the T extends forwardly terminating on the upper edge of lens 46.

To the rear of lens 52, there is provided space to receive a lamp 60, which is supported in a suitable metal socket 62 mounted on porcelain, ceramic or other material by which it is electrically insulated from base plate 22. Suitable leads connect the lamp to a source of electrical energy.

Space is provided between casing or cover 20, FIG. 6, and the outer surface of wall 34 to receive a fan 64 and means to drive it, which may preferably be a small induction motor 66. Motor 66 is secured to plate 16 about midway between the cover and base plate 20, by screws or other fastenings.

Except for the fan 64 and the means 66 whereby it is driven, the above described apparatus is principally utilized in the projection of images of slides or other subject matter to be reproduced as a projected image. In the absence of specific means to dissipate the heat given off by lamp 60, the apparatus would quickly become overheated with consequent danger to the operator or damage to the slide or to the equipment.

To avoid this, means have been provided for causing cool air to flow into casing 20, and to cause the air, once it has entered the enclosure to follow a specific path and by its movement through the apparatus, to carry off the heat generated by lamp 60 and any other part of the apparatus, e.g. the blower motor.

Louvers 120 are provided in casing 20 to admit unheated air into the enclosure, when a draft is induced by fan 64. The air passing into the casing first flows over and around fan motor 66 and as it is sucked in by the action of the blades of fan 64, the air is directed downwardly and is prevented from passing into the upper portion of the apparatus by a curved shield 80 which is closely spaced to the blades of fan 64 and which overhangs the blades. The forward end of shield 80 terminates adjacent the rear surface of mounting plate 16. The rear end of shield 80 projects rearwardly toward casing 20. One side edge of the shield 80 is preferably welded to wall 34 to confine the flow of air to a path along the underside of the shield, and hence the air entering through louvers 120 is prevented from proceeding in any path upwardly into the casing and must instead travel downwardly along the outer face of wall 34, thereby cooling the outer surface of the wall and removing some of the heat received by the wall from lamp 60 which throws heat onto the inner surface of wall 34.

As will appear from the fuller description which follows, the shape of the lower part of the lamp and condenser lens compartment is such that suitably placed deflectors in the compartment cooperate to channel cooling air upwardly to provide the cooling essential to the operation of the lamp and lenses for extended intervals of time.

The lower ends of walls 17, 32 and 34 as previously described, terminate well above base plate 22. Secured to base plate 22 at the rear of case 20, adjacent to the lower end of wall 32 and preferably shaped so as to form an extension of wall 32, is a curved baffle 82. Baffle 82, as shown, curves upwardly and forwardly and extends for the length of wall 32. Baffle 82 is open at the fan extends along wall 32 until it is ended by an upwardly curved deflector 84. Deflector 84 extends rearwardly from plate 16 until it intersects baffle 82. Deflector 84 and baffle 82 therefore cooperate to direct air driven by fan 64, into the lower portion of the lamp and condenser lens compartment and upwardly past the lamp and lenses mounted in the U shaped housing 30. A middle curved piece 86 extending transversely across well 30 and generally parallel to baffle 82, extends downwardly from adjacent the lower portion of the U shaped guide 44 and continues downwardly to base plate 22 to which it is secured. Baffle 86 directs air upwardly along the faces of lens 52. Baffle 86 preferably extends inwardly until it intersects deflector 84. A third transverse baffle is provided in the space below chamber 30. This baffle, identified as baffle 88 also extends inwardly until it intersects baffle 84.

The curvature of baffles 82 and 86 is such as to cause one portion of the air diverted downwardly by shield 80 to flow into the space below the well 30 and then to flow upwardly in the space surrounding lamp 60 and particularly along the rear surface of lens 52 which is thereby maintained cool. Thereafter instead of being redirected through additional zones requiring cooling, the now-heated air passes directly upwardly and out of the casing through louvers 124 located in the top surface of casing 20.

Another portion of the incoming cool air propelled by fan 64 passes into a channel defined by the front wall of baffle 86 and the rear wall of baffle 88. Baffle 88 is generally parallel to baffle 86 except that it is slightly more curved. Baffle 88 terminates at its upper end along the lower edge of the front lens 46. The curvature of the two baffles is such as to cause the air flowing into the space between them to flow upwardly and to sweep cool air along the front surface of the lens 52 and the rear surface of lens 46, since the air is prevented from flowing through the passage by the baffle 84 which closes off one side of the space below housing 30.

The remaining portion of the cooling air flows into the space under well 30 between baffle 88 and the rear of wall 16 and then proceeds upwardly past the front surface of lens 46 and out through louvers 124.

The several deflectors which have been described are so positioned that they not only cause cooling air to move in an upward direction, but also to apportion the air so as to distribute the greatest amount of air where the need is greatest, thus increasing the efficiency of the entire cooling operation.

For example, the deflector directing air past the slide being projected meters the amount of air so that film or slide popping is avoided, and deflectors 82 and 86 which define the air channel for cooling lamp 60 are shaped and positioned so that the major portion or volume of the cooling air is caused to flow past the major source of heat, lamp 60.

It will be seen that there has been provided a simple and compact means for introducing cool air into the projector and for directing the flow of such air along short restricted paths in which it forms a protective heat dissipating current which conveys heat away from the apparatus and serves to prevent overheating of the lenses and other heat sensitive portions of the projector.

It will be further seen that the air, once it has been heated is not caused to flow in a tortuous path past other heat-sensitive structure, but is voided directly from the apparatus immediately after it has become heated by contact with heat generating structures.

It will be further seen that there are provided definite channels for the air so as to ensure that a supply of cool air is furnished to both the front and rear portion of the lenses, and it will be noted that the resultant heated air is not permitted to approach the slides, slide magazine, or any other portion of the projector.

Finally it will be noted that cooling air drawn into the projector through the louvered opening 120 in the side, is forced up past the lamp and condenser lenses and follows the natural flow of air convection currents, thereby further increasing the efficiency of the cooling system even further and minimizing turbulence or dead pockets of accumulated heated air.

The fan, deflectors and air ducts have been so designed and positioned so as to minimize turbulence, by conducting the air through the apparatus and around the heat sources in such an efficient manner that a relatively small fan can be employed, thus contributing to the desirable attribute in such apparatus of noise reduction by virtue of the minimum air displacement.

Having now described our invention in accordance with the patent statutes, we claim:

1. A portable slide projector including a housing enclosed the entire mechanism, said housing consisting of a box-like cover portion seated on a base, the inner surface of said base comprising a floor within said housing; a lens and lamp compartment within said housing, bounded by a rear vertical wall and two vertical sidewalls, each of said sidewalls extending vertically from an upper extremity closely adjacent to the said cover to a lower extremity spaced an appreciable distance from the floor of said housing; a projection lamp adjacent said rear vertical wall and seated in a lamp socket resting directly on said floor; a lens system supported within said compartment, between said sidewalls and forwardly of said projection lamp; and an improved cooling system for said projector, comprising: an open grill located in the portion of the cover of said housing overlying the said compartment and defining an air outlet; another open grill located in one sidewall of said cover portion and defining an air inlet; a fan mounted within the housing between said air inlet and the nearer of the sidewalls of said lens and lamp compartment; means directing and confining the flow of air drawn into said housing by said fan comprising a curved shield mounted to extend closely adjacent to the circular path traversed by the tips of said fan blades in their uppermost travel having a first edge facing said air inlet and a second edge abutting the nearer sidewall of said lens and lamp compartment; a curved baffle extending from the floor of said housing from below the central region of the lamp and lens compartment upwardly to the lower extremity of that sidewall of said compartment which is further from said fan, whereby air impelled by the blades of said fan is caused to enter the lens compartment below the plane of the lower edge of the nearer sidewall of said compartment and to proceed upwardly between said sidewalls and past the surfaces of the lamp and lens members in said compartment and thence directly outwardly of said housing via said open grill defining the air outlet in the cover of said housing; and a plurality of relatively narrow curved deflectors extending generally in alignment with the axis of rotation of said fan and extending from said curved baffle to the plane of said nearer sidewall, the purpose of said deflectors being to assist in directing the air upwardly past the contents of said compartment, in proportion to the cooling requirements of the lamp and lenses contained in said compartment.

2. The mechanism of claim 1 wherein the plurality of relatively narrow curved deflectors is positioned closely adjacent to the lower floor inside said casing and consists of three deflector plates curving upwardly from said floor and curving rearwardly from the front wall of said casing, each of said deflector plates having a first end adjacent to the blades of the fan and a second end remote from the blades of the fan and terminating in said curved baffle, terminating the flow of air along said three deflector plates and redirecting the air upwardly within the housing wherein the lamp and lens system are enclosed.

References Cited in the file of this patent

UNITED STATES PATENTS

| | | |
|---|---|---|
| 2,281,988 | Osterberg et al. | May 5, 1942 |
| 2,817,267 | Halahan et al. | Dec. 24, 1957 |

FOREIGN PATENTS

| | | |
|---|---|---|
| 1,199,664 | France | June 22, 1959 |